United States Patent
Thunes

(10) Patent No.: US 7,168,245 B2
(45) Date of Patent: Jan. 30, 2007

(54) WORK MACHINE WITH SUPPLEMENTAL POWER STEERING

(75) Inventor: Allan S. Thunes, Apex, NC (US)

(73) Assignee: Caterpillar Inc, Peoria, IL (US)

( * ) Notice: Subject to any disclaimer, the term of this patent is extended or adjusted under 35 U.S.C. 154(b) by 64 days.

(21) Appl. No.: 11/016,423

(22) Filed: Dec. 20, 2004

(65) Prior Publication Data
US 2006/0130472 A1    Jun. 22, 2006

(51) Int. Cl.
*F16D 31/02* (2006.01)
(52) U.S. Cl. .................... 60/403; 60/405; 60/430; 60/487
(58) Field of Classification Search ........... 60/384, 60/399, 403, 405, 406, 429, 430, 496, 497, 60/486, 487; 91/1; 92/5 R
See application file for complete search history.

(56) References Cited

U.S. PATENT DOCUMENTS

| | | | | |
|---|---|---|---|---|
| 3,940,931 A | * | 3/1976 | Renfro et al. | 60/403 |
| 3,952,511 A | * | 4/1976 | Turner et al. | 60/430 |
| 4,700,794 A | * | 10/1987 | Bernhagen et al. | 60/444 |
| 4,798,256 A | * | 1/1989 | Fassbender | 180/406 |
| 4,942,935 A | | 7/1990 | Lech | |
| 5,022,481 A | | 6/1991 | Carter | |
| 5,069,037 A | * | 12/1991 | Sakigawa et al. | 60/435 |
| 5,165,233 A | * | 11/1992 | Betz | 60/488 |
| 5,381,987 A | | 1/1995 | Carns | |

* cited by examiner

*Primary Examiner*—Igor Kershteyn
(74) *Attorney, Agent, or Firm*—Finnegan, Henderson, Farabow, Garrett & Dunner

(57) ABSTRACT

A steering system for a work machine having a hydrostatic transmission is disclosed. The steering system has a primary source of pressurized fluid and a steering control valve. The steering system also has a first fluid passageway fluidly connecting the primary source of pressurized fluid to the steering control valve and a second fluid passageway fluidly connecting the hydrostatic transmission to the steering control valve.

32 Claims, 2 Drawing Sheets

WORK MACHINE WITH SUPPLEMENTAL POWER STEERING

TECHNICAL FIELD

The present disclosure relates generally to a work machine, and more particularly to a work machine having supplemental power steering.

BACKGROUND

Work machines, including wheel loaders, dump trucks, motor graders, excavators, and other types of heavy machinery, are used for a variety of tasks. These work machines may include mechanisms that are hydraulically actuated to affect steering of the work machine in order to accomplish the tasks. For example, a work machine may include an articulated joint and an associated hydraulic cylinder connected to the work machine. The hydraulic cylinder may extend or retract in response to pressurized fluid from a main source such as, for example, a power steering pump. The expansion and retraction of the hydraulic cylinder may cause a forward end of the work machine to pivot about the articulated joint relative to a back end of the work machine, thereby affecting steering of the work machine.

Work machines may be provided with a backup source of pressurized fluid to provide emergency power steering fluid in the event of failure of the power steering pump or during failure of a power source driving the power steering pump. One such example is described in U.S. Pat. No. 5,022,481 (the '481 patent) issued to Carter et al. on Jun. 11, 1991. The '481 patent describes an emergency power steering system backup apparatus for supplying a vehicle's power steering unit with an emergency supply of power steering fluid when the vehicle's primary power steering pump fails. The apparatus includes a manually-charged emergency power steering fluid supply that is activated when the power steering pump pressure falls below a minimum level, while the vehicle is traveling at a speed above a minimum activating speed. The manually-charged emergency power steering fluid supply includes a supply of hydraulic fluid and a container of compressed gas. When the emergency fluid supply is activated, the compressed gas is directed into the fluid container to drive the fluid to the vehicle's power steering unit.

While the emergency power steering backup apparatus of the '481 patent may provide some steering control of the work machine during failure of the power steering pump, the manually-charged emergency power steering fluid supply of the '481 patent may be insufficient if the work machine is traveling at high speeds or on sloped terrain. In particular, because the emergency supply of power steering fluid is finite, the supply may be exhausted before the work machine is brought to a complete stop. Further, because the emergency supply is manually charged, the supply must be manually recharged after each use. Neglecting to recharge the system could result in little or no backup supply during a subsequent power steering pump failure.

The emergency power steering backup apparatus of the '481 patent may also consume design space and be expensive. Specifically, because the backup apparatus of the '481 patent is additive and serves no purpose other than during power steering pump failure, the apparatus may consume space otherwise available for design of primary work machine systems. Similarly, because the backup apparatus of the '481 patent is dedicated to only providing emergency backup steering, the backup apparatus increases the cost of the base work machine.

The disclosed steering system is directed to overcoming one or more of the problems set forth above.

SUMMARY OF THE INVENTION

In one aspect, the present disclosure is directed to a steering system for a work machine having a hydrostatic transmission. The steering system includes a primary source of pressurized fluid and a steering control valve. The steering system also includes a first fluid passageway fluidly connecting the primary source of pressurized fluid to the steering control valve and a second fluid passageway fluidly connecting the hydrostatic transmission to the steering control valve.

In another aspect, the present disclosure is directed to a method of operating a work machine having a hydrostatic transmission. The method includes selectively directing pressurized fluid from a primary source to a steering control valve, and selectively directing pressurized fluid from the hydrostatic transmission to the steering control valve. The method also includes selectively actuating the steering control valve to communicate the pressurized fluid from at least one of the primary source and the hydrostatic transmission with a hydraulic actuator.

DETAILED DESCRIPTION

Figure 1:
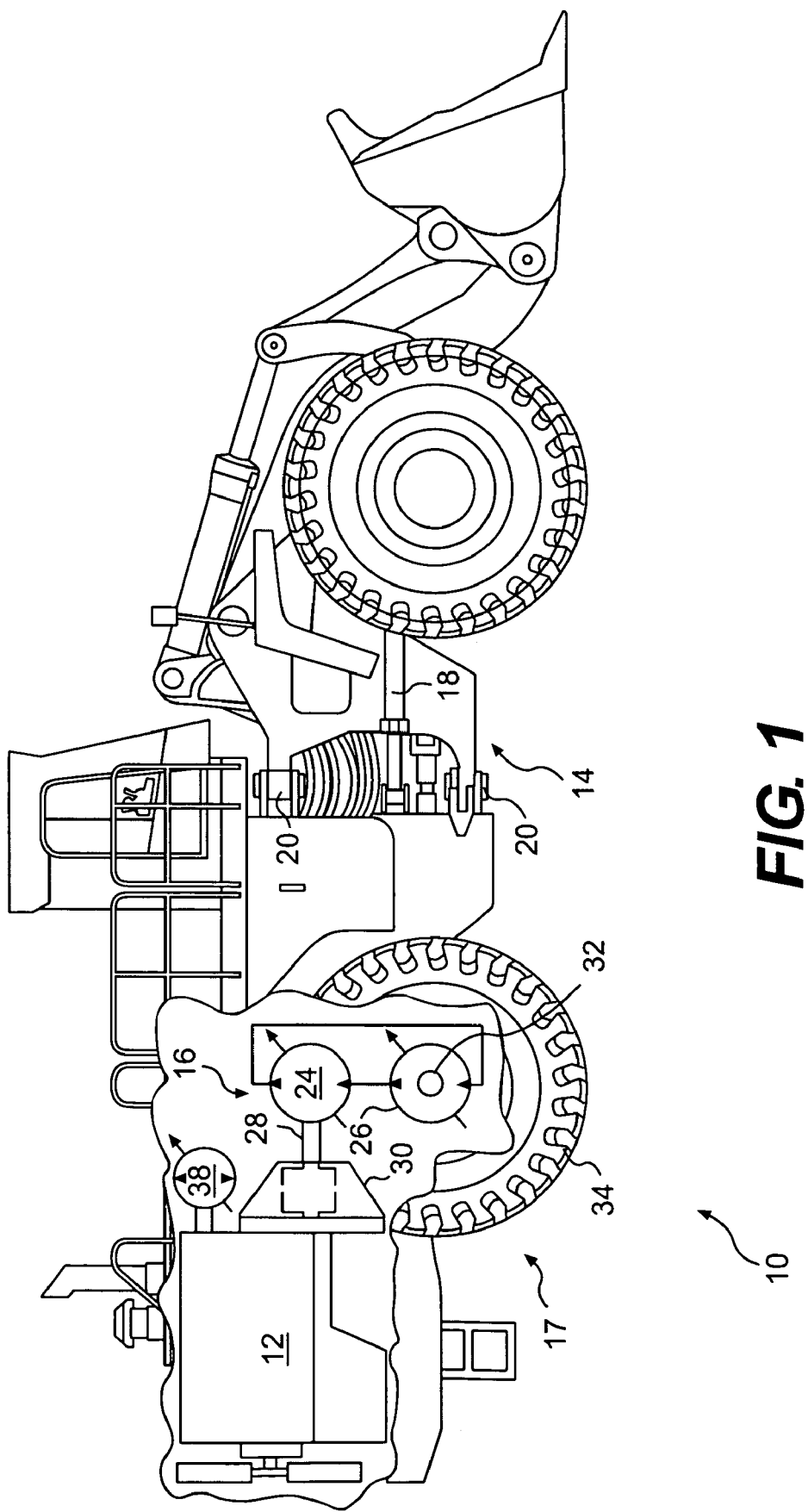
FIG. 1 is a diagrammatic illustration of an exemplary disclosed work machine.

FIG. 1 illustrates an exemplary embodiment of a work machine 10. Work machine 10 may be a mobile machine that performs some type of operation associated with an industry such as mining, construction, farming, or any other industry known in the art. For example, work machine 10 may be an earth moving machine such as a wheel loader, a dump truck, a backhoe, a motor grader, or any other suitable operation-performing work machine. Work machine 10 may include a power source 12, a steering mechanism 14, and a transmission 16 connected to at least one driven traction device 17.

Power source 12 may be an engine such as, for example, a diesel engine, a gasoline engine, a gaseous fuel powered engine such as a natural gas engine, or any other engine apparent to one skilled in the art. Power source 12 may also embody another source of power such as a fuel cell, a power storage device, or any other source of power known in the art.

Steering mechanism 14 may include one or more hydraulic cylinders 18 located on each side of work machine 10 (only one side shown) that function in cooperation with a centrally-located articulated joint 20. To affect steering, the hydraulic cylinder 18 located on one side of work machine 10 may extend while the hydraulic cylinder 18 located on the opposite side of work machine 10 simultaneously retracts, thereby causing a forward end of work machine 10 to pivot about articulated joint 20 relative to a back end of work machine 10. It is contemplated that steering mechanism 14 may alternatively include a greater or lesser number of hydraulic cylinders 18, a different configuration of hydraulic cylinders 18 such as a direct connection to one or more steerable traction devices of work machine 10, and/or that hydraulic cylinders 18 may be omitted and the steering of work machine 10 affected by a different type of hydraulic actuator such as, for example, a hydraulic motor in a rack and pinion configuration.

The extension and retraction of hydraulic cylinder 18 may be accomplished by creating an imbalance of force on a piston assembly (not shown) disposed within a tube (not shown) of hydraulic cylinder 18. Specifically, each of hydraulic cylinders 18 may include a first chamber (not shown) and a second chamber (not shown) separated by the piston assembly. The piston assembly may include a piston (not shown) axially aligned with and disposed within the tube. The piston may include two opposing hydraulic surfaces, one associated with each of the first and second chambers. The first and second chambers may be selectively supplied with a pressurized fluid and drained of the pressurized fluid to create an imbalance of force on the two surfaces that causes the piston assembly to axially move within the tube. For example, a fluid pressure within the first hydraulic chamber acting on a first hydraulic surface being greater than a fluid pressure within the second hydraulic chamber acting on a second opposing hydraulic surface may cause the piston assembly to displace to increase the effective length of hydraulic cylinder 18. Similarly, when a fluid pressure acting on the second hydraulic surface is greater than a fluid pressure acting on the first hydraulic surface, the piston assembly may retract within the tube to decrease the effective length of hydraulic cylinder 18. A sealing member (not shown), such as an o-ring, may be connected to the piston to restrict a flow of fluid between an internal wall of the tube and an outer cylindrical surface of the piston.

Transmission 16 may be connected to power source 12 and may include at least one pump 24 fluidly connected to at least one motor 26 in a single or dual-path configuration. Pump 24 and motor 26 may be variable displacement, variable delivery, fixed displacement, or any other configuration of pump 24 and motor 26 known in the art. Pump 24 may be connected to power source 12 via an input shaft 28 through a torque converter 30. Alternately, pump 24 may be connected to power source 12 via a gear box (not shown), connected directly to power source 12, or connected to power source 12 in any other manner known in the art. Transmission 16 may also include an output shaft 32 connecting motor 26 to driven traction device 17. Work machine 10 may or may not include a reduction gear arrangement such as, for example, a planetary arrangement disposed between motor 26 and driven traction device 17.

Driven traction device 17 may include wheels 34 located on each side of work machine 10 (only one side shown). Alternately, driven traction device 17 may include tracks, belts or other traction devices. It is contemplated that driven traction device 17 may include a differential gear assembly (not shown) configured to divide power from power source 12 between wheels 34 located on either side of work machine 10. The differential gear assembly may allow wheels 34 on one side of work machine 10 to turn faster than wheels 34 located on an opposite side of work machine 10.

Figure 2:
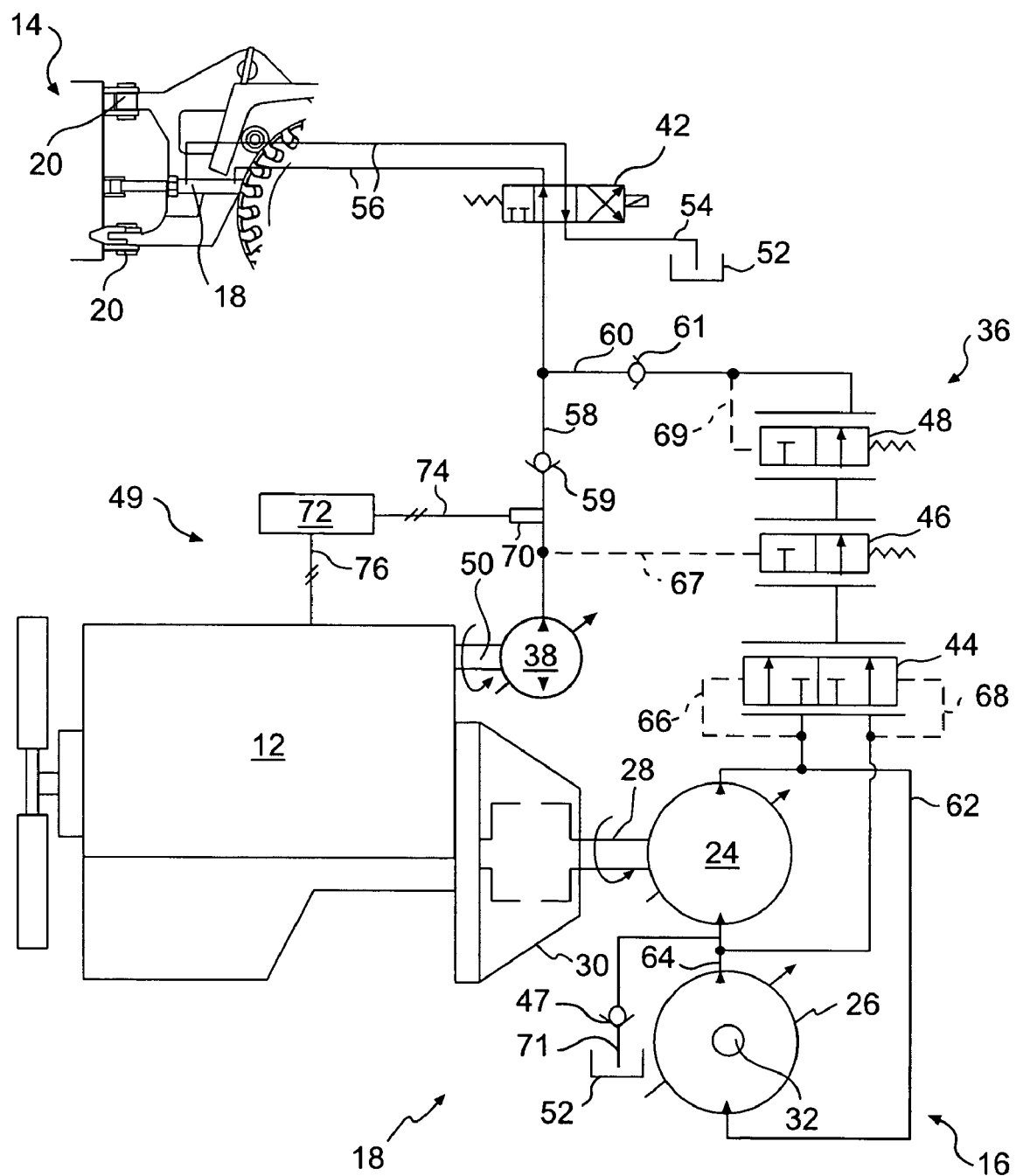
FIG. 2 is a schematic and diagrammatic illustration of an exemplary disclosed steering system for the work machine of FIG. 1.

As illustrated in FIG. 2, work machine 10 may also include a hydraulic circuit 36 configured to actuate steering mechanism 14. Hydraulic circuit 36 may include a primary source 38 of pressurized fluid fluidly connected to hydraulic cylinder 18, a steering control valve 42, a transmission pressure-resolving valve 44, a spring-biased first valve 46, a spring-biased second valve 48, a transmission makeup valve 47, and a control system 49.

Primary source 38 may be configured to produce a flow of pressurized fluid and may include a variable displacement pump, a fixed displacement pump, a variable flow pump, or any other source of pressurized fluid known in the art. Primary source 38 may be drivably connected to power source 12 by, for example, a countershaft 50, a belt (not shown), an electrical circuit (not shown), or in any other suitable manner. Although FIG. 2 illustrates primary source 38 being dedicated to supplying pressurized fluid to only hydraulic circuit 36, it is contemplated that primary source 38 may alternately supply pressurized fluid to additional work machine hydraulic circuits.

Steering control valve 42 may be fluidly connected to a tank 52 via a fluid passageway 54 and to hydraulic cylinder 18 via two or more fluid passageways 56 to control actuation of hydraulic cylinder 18. In particular, steering control valve 42 may include at least one valve element that functions to meter pressurized fluid to one of the first and second chambers within hydraulic cylinder 18, and to allow fluid from the other of the first and second chambers to drain to tank 52. Specifically, the valve element of steering control valve 42 may be solenoid actuated against a spring bias to move between a first position at which fluid is allowed to flow into one of the first and second chambers while allowing the fluid to drain from the other of the first and second chambers to tank 52, a second position at which the flow directions are reversed, and a third position at which fluid flow is blocked from both of the first and second chambers. The term blocked, for the purposes of this disclosure, is to be interpreted as at least partially restricted from fluid flow. It is also contemplated that the valve element, when in the blocked position, may fully restrict fluid flow. The location of the valve mechanism between the first, second, and third positions may determine a flow rate of the pressurized fluid directed into and out of the associated first and second chambers. It is contemplated that one steering control valve 42 may control the filling and draining functions for hydraulic cylinders 18 located on both sides of work machine 10 or, alternatively, that a separate steering control valve 42 may be associated with each hydraulic cylinder 18. It is also contemplated that steering control valve 42 may alternatively be replaced with multiple independent metering valves that control the filling and draining functions of each of the first and second chambers for each hydraulic cylinder 18. It is further contemplated that steering control valve 42 may alternatively be hydraulically actuated, mechanically actuated, pneumatically actuated, or actuated in any other suitable manner.

Steering control valve 42 may be fluidly connected to both primary source 38 and transmission 16. In particular, steering control valve 42 may be connected to primary source 38 via a fluid passageway 58 and to transmission 16 via a fluid passageway 60. A first check valve 59 may be disposed within fluid passageway 58, and a second check valve 61 may be disposed within fluid passageway 60 to ensure one-directional flows of fluid toward steering control valve 42.

Transmission pressure-resolving valve 44 may be disposed between fluid passageway 60 and a supply passageway 62 and a return passageway 64 of transmission 16. Note that during reverse movement of work machine 10, the flow of fluid through transmission 16 and the associated supply and return functions of supply passageway 62 and return passageway 64 are switched. Transmission pressure-resolving valve 44 may include a valve element configured to move between a first position at which pressurized fluid from supply passageway 62 is communicated with fluid passageway 60 and a second position at which pressurized fluid from return passageway 64 is communicated with fluid passageway 60. The valve element of transmission pressure-resolving valve 44 may be movable between the first and second positions by pressurized fluid. The pressurized fluid may be directed from supply and return passageways 62, 64 to opposing ends of the valve element of transmission pressure-resolving valve 44 via a fluid passageway 66 and a fluid passageway 68, such that the higher of the two pressures is always communicated with fluid passageway 60.

First valve 46 may be disposed within fluid passageway 60 downstream of transmission pressure-resolving valve 44 and configured to meter the flow of pressurized fluid from transmission 16 through fluid passageway 60. In one embodiment, first valve 46 may be include a valve element movable from a flow-passing position against a spring bias toward a flow-blocking position by pressurized fluid. The pressurized fluid may be communicated from primary source 38 to an end of the valve element of first valve 46 via a fluid passageway 67.

Second valve 48 may be disposed within fluid passageway 60 downstream of first valve 46 and configured to meter the flow of pressurized fluid from transmission 16 through fluid passageway 60. In particular, second valve 48 may include a valve element movable from a flow-passing position against a spring bias toward a flow-blocking position by pressurized fluid. The pressurized fluid may be directed from transmission 16 downstream of second valve 48 to an end of the valve element of second valve 48 via a fluid passageway 69.

Transmission makeup valve 47 may be configured to replenish fluid passed from transmission 16 to steering control valve 42. Specifically, transmission makeup valve 47 may be disposed within a fluid passageway 71, between transmission 16 and tank 52 and configured to allow one-directional flow from tank 52 to transmission 16 in response to the pressure within transmission 16 being less than the pressure of the fluid within tank 52.

Control system 49 may include components in communication with hydraulic circuit 36 and power source 12. In particular, control system 49 may include a sensor 70 configured to monitor a parameter indicative of a pressure of the fluid from primary source 38, and a controller 72 in communication with sensor 70 via a communication line 74 and in communication with power source 12 via a communication line 76.

Controller 72 may embody a single microprocessor or multiple microprocessors that include a means for controlling an operation of power source 12. Numerous commercially available microprocessors can be configured to perform the functions of controller 72. It should be appreciated that controller 72 could readily embody a general work machine microprocessor capable of controlling numerous work machine functions. Controller 72 may include a memory, a secondary storage device, a processor, and any other components for running an application. Various other circuits may be associated with controller 72 such as power supply circuitry, signal conditioning circuitry, solenoid driver circuitry, and other types of circuitry.

Controller 72 may be configured to control an operation of power source 12 in response to pressure of the fluid from primary source 38. In particular, controller 72 may receive a signal from sensor 70 indicative of pressure of the fluid from primary source 38 and may be configured to bring work machine 10 to a controlled stop when the fluid pressure from primary source 38 is below a predetermined pressure value. During the controlled stop, transmission 16 may enter a regenerative mode, wherein the motion of driven traction device 17 drives motor 26 to pressurize fluid within transmission 16. The regenerated fluid from motor 26 may then be directed to steering control valve 42 to ensure that steering control of work machine 10 is maintained even when primary source 38 is no longer pressurizing fluid. It is contemplated that the operation of pump 24 of transmission 16 may alternately be controlled to produce the flow of pressurized fluid directed to steering control valve 42 in response to the signal from sensor 70, with or without the controlled stopping of work machine 10.

Work machine 10 may be brought to a controlled stop in a number of ways. For example, a torque or speed output of power source 12 may be limited by reducing a fuel delivery rate, by controlling a fuel delivery timing, by limiting air flow through power source 12, or in other manner known in the art. Work machine 10 may also be brought to a controlled stop by automatic application of a braking mechanism (not shown) such as a drive train brake, an engine brake, or any other appropriate braking mechanism, by controlling a displacement of pump 24 and/or motor 26, or in any other suitable manner. It is contemplated that, instead of automatically bringing work machine 10 to a controlled stop, controller 72 may alternatively produce a fault signal such as, for example, an illuminated warning lamp, an alarm, a message on a display screen, or any other such fault signal that may inform a work machine operator of the low fluid pressure from primary source 38. The operator may then manually bring work machine 10 to a controlled stop.

INDUSTRIAL APPLICABILITY

The disclosed steering system may be applicable to any work machine having a hydrostatic transmission and utilizing power steering. The disclosed steering system directs pressurized fluid from the hydrostatic transmission to a steering mechanism in the event of steering pump and/or power source failure to provide steering control of the work machine until travel of the work machine has ceased. Operation of the disclosed steering system will now be explained.

Hydraulic cylinder 18 may be movable by fluid pressure to affect steering of work machine 10. During operation of work machine 10, hydraulic fluid pressurized by primary source 38 may be directed to steering control valve 42. Steering control valve 42 may selectively allow the pressurized fluid to flow into one of the first or second chambers of hydraulic cylinder 18. Substantially simultaneously, steering control valve 42 may allow fluid from the other of the first and second chambers to drain to tank 52 to create a force imbalance on the piston of hydraulic cylinder 18 that causes the piston assembly to move, thereby either extending or retracting the piston assembly relative to the tube. The extension of hydraulic cylinder 18 on one side of work machine 10 and the retraction of hydraulic cylinder 18 on the opposite side of work machine 10 may create a moment about articulated joint 20 that causes the forward end of work machine 10 to pivot relative to the back end of work machine 10.

Controller 72 may be configured to change operation of work machine 10 to provide backup steering in the event of failure of primary source 38 or of power source 12, which drives primary source 38. In particular, as controller 72 determines that primary source 38 is no longer sufficiently pressurizing fluid, controller 72 may either automatically bring work machine 10 to a controlled stop or warn a work machine operator of the lack of pressurized fluid and allow the operator to bring work machine 10 to a stop. As work machine 10 is brought to a stop, motor 26 of transmission 16 may be driven by driven traction device 17 in a regenerative mode, which pressurizes the fluid within transmission 16. This pressurized fluid may then be directed to steering control valve 42 to allow continued manipulation of hydraulic cylinders 18.

The disclosed steering system provides sufficient backup steering regardless of the speed of work machine 10 or the terrain over which work machine 10 is traveling. In particular, because motor 26 of transmission 16 will continue in the regenerative mode and pressurize fluid as long as work machine 10 is moving, there is no limit on the amount of backup pressurized fluid supplied to steering control valve 42. Further, because the fluid is automatically pressurized by motor 26 as work machine 10 is being brought to a stop, no manually recharging is required.

In addition, the disclosed steering system only minimally increases the cost and size of work machine 10. In particular, because the backup source of pressurized fluid is motor 26 of existing transmission 16, the only additional components include valving and routing components that are required to direct the pressurized fluid from motor 26 to steering control valve 42.

It will be apparent to those skilled in the art that various modifications and variations can be made to the disclosed steering system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A steering system for a work machine having a hydrostatic transmission, the steering system comprising:
    a primary source of pressurized fluid;
    a steering control valve;
    a first fluid passageway fluidly connecting the primary source of pressurized fluid to the steering control valve; and
    a second fluid passageway fluidly connecting the hydrostatic transmission to the steering control valve;
    wherein the system directs pressurized fluid from the hydrostatic transmission to the steering control valve.

2. The steering system of claim 1, further including a first valve disposed within the second fluid passageway and having a valve element movable between a flow passing and a flow blocking position in response to fluid pressure within the first fluid passageway.

3. The steering system of claim 2, further including a second valve disposed within the second fluid passageway and having a valve element movable between a flow passing position and a flow blocking position in response to fluid pressure within the second fluid passageway.

4. The steering system of claim 3, wherein the valve element of the second valve is movable in response to fluid pressure within the second fluid passageway downstream of the second valve.

5. The steering system of claim 1, further including a first check valve disposed within the first fluid passageway and a second check valve disposed within the second fluid passageway.

6. The steering system of claim 1, wherein the hydrostatic transmission includes a pump fluidly connected to a motor via a supply passageway and a return passageway and the steering system further includes a valve disposed between the second fluid passageway and the supply and return fluid passageways, the valve having a valve element movable between a first position at which fluid from the supply passageway is communicated with the second fluid passageway and a second position at which fluid from the return passageway is communicated with the second fluid passageway.

7. The steering system of claim 6, wherein the valve element is moveable in response to fluid pressure within the supply and return passageways to allow the fluid from the one of the supply and return passageways having the higher pressure to communicate with the second fluid passageway.

8. The steering system of claim 1, further including a fluid actuator in communication with the steering control valve and movable in response to pressurized fluid to affect steering of the work machine.

9. The steering system of claim 1, further including:
    a sensor configured to sense a parameter indicative of a pressure of the pressurized fluid from the primary source; and
    a controller in communication with the sensor and the work machine, the controller configured to bring the work machine to a stop when the pressure of the pressurized fluid from the primary source is below a predetermined value.

10. The steering system of claim 9, wherein the work machine has a power source, the controller is in communication with the power source, and the controller brings the work machine to a stop by limiting an output of the power source.

11. The steering system of claim 9, wherein the hydrostatic transmission includes a pump, the controller is in communication with the pump, and brings the work machine to a stop by limiting an output of the pump.

12. The steering system of claim 9, wherein bringing the work machine to a stop causes a motor of the hydrostatic transmission to regenerate and pressurize fluid that is directed to the steering control valve via the second fluid passageway.

13. The steering system of claim 1, further including:
    a tank configured to hold a supply of fluid; and
    a makeup valve disposed between the tank and the hydrostatic transmission, the makeup valve configured to replenish the pressurized fluid directed from the hydrostatic transmission to the steering control valve.

14. A method of steering a work machine having a hydrostatic transmission, the method comprising:
    selectively directing pressurized fluid from a primary source to a steering control valve;
    selectively directing pressurized fluid from the hydrostatic transmission to the steering control valve; and
    selectively actuating the steering control valve to communicate the pressurized fluid from at least one of the primary source and the hydrostatic transmission with a hydraulic actuator.

15. The method of claim 14, further including selectively blocking pressurized fluid from the hydrostatic transmission to the steering control valve in response to a pressure of the fluid from the primary source.

16. The method of claim 14, further including selectively blocking pressurized fluid from the hydrostatic transmission in response to a pressure of the fluid from the hydrostatic transmission.

17. The method of claim 14, wherein the hydrostatic transmission includes a pump fluidly connected to a motor via a supply passageway and a return passageway, and selectively directing pressurized fluid from the hydrostatic transmission to the steering control valve includes selectively directing pressurized fluid from the one of the supply and return passageways having fluid with the higher pressure.

18. The method of claim 14, further including sensing a pressure of the pressurized fluid from the primary source and bringing the work machine to a stop when the sensed pressure is below a predetermined value.

19. The method of claim 18, wherein the work machine has a power source and bringing the work machine to a stop includes limiting an output of the power source.

20. The method of claim 18, wherein the hydrostatic transmission has a pump and bringing the work machine to a stop includes limiting an output of the pump.

21. The method of claim 18, wherein bringing the work machine to a stop causes a motor of the hydrostatic transmission to regenerate and pressurize the fluid that is directed from the hydrostatic transmission to the steering control valve.

22. The method of claim 14, further including directing fluid from a tank to the hydrostatic transmission to replenish the pressurized fluid directed from the hydrostatic transmission to the steering control valve.

23. A work machine, comprising:
   at least one driven traction device;
   a hydrostatic transmission configured to drive the driven traction device; and
   a steering system configured to affect steering of the work machine, the steering system including:
      a primary source of pressurized fluid;
      a steering control valve;
      a first fluid passageway fluidly connecting the primary source of pressurized fluid to the steering control valve; and
      a second fluid passageway fluidly connecting the hydrostatic transmission to the steering control valve;
      wherein the system directs pressurized fluid from the hydrostatic transmission to the steering control valve.

24. The work machine of claim 23, further including a first valve disposed within the second fluid passageway and having a valve element movable between a flow passing and a flow blocking position in response to fluid pressure within the first fluid passageway.

25. The work machine of claim 24, further including a second valve disposed within the second fluid passageway and having a valve element movable between a flow passing position and a flow blocking position in response to fluid pressure within the second fluid passageway, wherein the valve element of the second valve is movable in response to fluid pressure within the second fluid passageway downstream of the second valve.

26. The work machine of claim 23, wherein the hydrostatic transmission includes a pump fluidly connected to a motor via a supply passageway and a return passageway, and the steering system further includes a valve disposed between the second fluid passageway and the supply and return passageways, the valve having a valve element movable between a first position at which fluid from the supply passageway is communicated with the second fluid passageway, and a second position at which fluid from the return passageway is communicated with the second fluid passageway.

27. The work machine of claim 26, wherein the valve element is moveable in response to fluid pressure within the supply and return passageways to allow the fluid from the one of the supply and return passageways having the higher pressure to communicate with the second fluid passageway.

28. The work machine of claim 23, further including a fluid actuator in communication with the steering control valve, operatively connected to the work machine, and movable in response to fluid pressure to affect steering of the work machine.

29. The work machine of claim 23, further including:
   a pressure sensor configured to sense a parameter indicative of a pressure the pressurized fluid from the primary source; and
   a controller in communication with the sensor and the work machine, the controller configured to bring the work machine to a stop when the pressure of the pressurized fluid from the primary source is below a predetermined value.

30. The work machine of claim 29, wherein the work machine has a power source, the controller is in communication with the power source, and the controller brings the work machine to a stop by limiting an output of the power source.

31. The work machine of claim 29, wherein the hydrostatic transmission has a pump, the controller is in communication with the pump, and the controller brings the work machine to a stop by limiting an output of the pump.

32. The work machine of claim 29, wherein bringing the work machine to a stop causes a motor of the hydrostatic transmission to regenerate and pressurize fluid that is directed to the steering control valve via the second fluid passageway.

* * * * *